US012570265B2

(12) United States Patent
    Kinoshita

(10) Patent No.:    US 12,570,265 B2
(45) Date of Patent:        Mar. 10, 2026

(54) VEHICLE

(71) Applicant: TOYOTA JIDOSHA KABUSHIKI KAISHA, Toyota (JP)

(72) Inventor: Goki Kinoshita, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/892,631

(22) Filed: Sep. 23, 2024

(65) Prior Publication Data

US 2025/0121812 A1    Apr. 17, 2025

(30) Foreign Application Priority Data

Oct. 12, 2023    (JP) ................................. 2023-176809

(51) Int. Cl.
    *G07C 5/00*        (2006.01)
    *B60W 10/08*        (2006.01)
    *G07C 5/02*        (2006.01)
    *G07C 5/04*        (2006.01)
    *G07C 5/08*        (2006.01)
(52) U.S. Cl.
    CPC ....... *B60W 10/08* (2013.01); *B60W 2510/244*
                                                (2013.01)

(58) Field of Classification Search
    CPC ........................ B60W 10/08; B60W 2510/244
    See application file for complete search history.

(56)                References Cited

U.S. PATENT DOCUMENTS

2012/0200241  A1      8/2012  Kojima et al.
2019/0193578  A1*    6/2019  Fujiyoshi ............ B60L 15/2036

FOREIGN PATENT DOCUMENTS

JP        2012-165526  A    8/2012
JP        2019-115218  A    7/2019

* cited by examiner

*Primary Examiner* — Kito R Robinson
*Assistant Examiner* — Anthony Gabriel Mora
(74) *Attorney, Agent, or Firm* — Dinsmore & Shohl LLP

(57)                ABSTRACT

A vehicle includes: a plurality of motors having different loss characteristics during regeneration from each other, a battery that can be charged by power generated during the regeneration of each of the plurality of motors; a detection device for detecting power information related to a power state of the battery; and a control device for causing a motor, which has a greater loss characteristic of the regeneration than that of other motors among the plurality of motors, to perform the regeneration when determining that the battery is performing an input limit of the power at the time of the regeneration based on the power information.

4 Claims, 4 Drawing Sheets

VEHICLE

CROSS-REFERENCE TO RELATED APPLICATION(S)

The present application claims priority to and incorporates by reference the entire contents of Japanese Patent Application No. 2023-176809 filed in Japan on Oct. 12, 2023.

BACKGROUND

The present disclosure relates to a vehicle.

Japanese Laid-open Patent Publication No. 2019-115218 discloses a front wheel electric motor for driving the front wheels and a rear wheel electric motor for driving the rear wheels, one constituted by a permanent magnet type motor, the other electric vehicle constituted by a magnet-less motor is described. This electric vehicle drives a permanent magnet type motor in the case of low vehicle speed, and drives only by a magnet-less motor in the case of high speed.

SUMMARY

There is a need for providing a vehicle capable of securing the braking force even when the input limit of the power of the battery occurs.

According to an embodiment, a vehicle includes: a plurality of motors having different loss characteristics during regeneration from each other, a battery that can be charged by power generated during the regeneration of each of the plurality of motors; a detection device for detecting power information related to a power state of the battery; and a control device for causing a motor, which has a greater loss characteristic of the regeneration than that of other motors among the plurality of motors, to perform the regeneration when determining that the battery is performing an input limit of the power at the time of the regeneration based on the power information.

DETAILED DESCRIPTION

In Japanese Laid-open Patent Publication No. 2019-115218, when the battery is in a fully charged state or a low temperature state or the like input limit of power occurs, the driver accelerates off, without using the hydraulic brake, when decelerating, the electric vehicle cannot be decelerated by regeneration by the motor, there is a problem that the deceleration is insufficient.

Hereinafter, a vehicle according to an embodiment of the present disclosure will be described with reference to the drawings. Note that the components in the following embodiments include those which can be substituted and easily by those skilled in the art, or those which are substantially the same. Further, the drawings referred to in the following description are only schematically illustrating the shape, size, and positional relationship to the extent that the contents of the present disclosure can be understood. In other words, the present disclosure is not limited only to the shape, size, and positional relationship exemplified in each of the figures.

Configuration of the Vehicle

Figure 1:
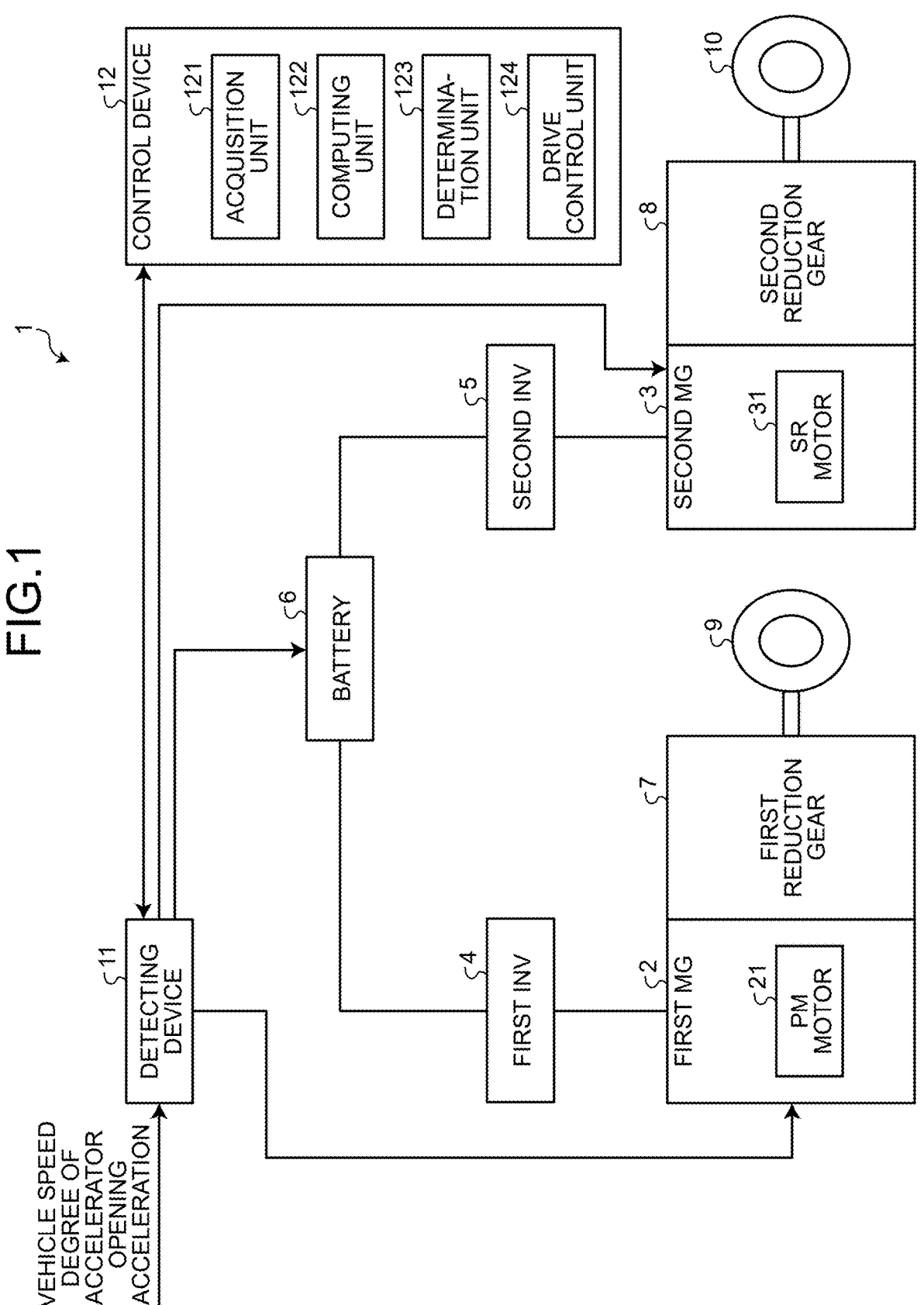
FIG. 1 is a diagram schematically illustrating a vehicle according to an embodiment.

FIG. 1 is a diagram schematically illustrating a vehicle according to an embodiment. A vehicle 1 illustrated in FIG. 1, a Hybrid Electric Vehicle (HEV) and a Plug-in Hybrid Electric Vehicle (PHEV) mounted motor and engine, a Battery Electric Vehicle (BEV), and a Fuel Cell Electric Vehicle (FCEV) and the like are assumed. In the following, the vehicle 1 will be described an electric vehicle for driving four wheels by an electric motor.

As illustrated in FIG. 1, the vehicle 1 includes a first motor generator 2 (hereinafter, simply referred to as "first MG 2"), a second motor generator 3 (hereinafter, simply referred to as "second MG 3"), a first inverter 4 (hereinafter, simply referred to as "first INV 4"), a second inverter 5 (hereinafter, referred to as "second INV 5"), a battery 6, a first reduction gear 7, a second reduction gear 8, a front wheel 9, a rear wheel 10, a detecting device 11, and a control device 12.

The first MG 2 is a front-wheel motor for driving the front wheels 9. The first MG 2 is constituted by a permanent magnet type motor 21 using at least permanent magnets (hereinafter, simply referred to as "PM motor 21"). The PM motor 21 can serve as a motor and a generator. The PM motor 21 is electrically connected to the battery 6 through the first inverter 4. The PM motor 21 is connected to the front wheel 9 via a first reduction gear 7 and a differential device (not shown) in a power transmissible manner. That is, the torque of the first MG 2 transmits only the front wheel 9.

The second MG 3 is a rear-wheel motor for driving the rear wheel 10. The second MG 3 is constituted by a synchronous reluctance (Synchronous Reluctance) motor 31 of the magnet-less motor without at least permanent magnets (hereinafter, simply referred to as "SR motor 31"). For example, the SR motor 31 may be a winding field motor as a magnet-less motor, an induction motor, a switched reluctance motor (Switched Reluctance Motor) or the like. The SR motor 31 can serve as a motor and generator. The SR motor 31 is electrically connected to the battery 6 through the second inverters 5. The SR motor 31 is connected to the rear wheel 10 to allow power transmission through the second reduction gear 8 and the differential device (not shown). That is, the torque of the second MG 3 is transmitted only to the rear wheel 10. Incidentally, the arrangement of the front and rear motors may be reversed. That is, the magnet-less motor in the front wheel, may be a configuration of a magnet motor in the rear wheel.

The first inverter 4, under the control of the control device 12, for example, to drive PM motor 21 serving as a power source for traveling, a function of converting the DC power supplied from the battery 6 to the AC power and the AC power supplied from PM motor 21 has a function of converting into DC power for battery charge. Specifically, the first inverter 4 converts the DC power of the battery 6 into AC power is supplied to PM motor 21, to generate a running driving force to PM motor 21. The first inverter 4, the regenerative AC power of PM motor 21 is converted back to DC power, to charge for supplying to the battery 6. The first inverter 4 may further have a DC/DC converting function for boosting and lowering the voltage of the DC power.

The second inverter 5, under the control of the control unit 12, for example, to drive the SR motor 31 serving as a power source for traveling, a function of converting the DC power supplied from the battery 6 to the AC power supplied from the function and the SR motor 31 for supplying to convert the DC power to the DC power for battery charge has a function. Specifically, the first inverter 4 converts the DC power of the battery 6 into AC power is supplied to SR motor 31, to generate a running driving force to SR motor 31. The first inverter 4, the regenerative AC power of SR motor 31 is converted back to DC power, to charge for supplying to the battery 6. The second inverter 5 may further have a DC/DC converting function for boosting and lowering the voltage of the DC power.

The battery 6 is configured using a battery pack configured by a plurality of battery cells are connected in series. The battery 6, rechargeable secondary battery such as a lithium ion battery is used.

The detecting device 11 detects the degree of accelerator opening, the vehicle speed of the vehicle 1, the power information about the power status of the battery 6, the motor rotational speed of PM motor 21, and the motor rotational speed of SR motor 31. The detection device 11 is configured by using various sensors. For example, the detection device 11 is configured using a voltmeter, an ammeter, an acceleration sensor, a gyro sensor, a temperature sensor or the like.

The control device 12 is comprised of an Electronic Control Unit (ECU) using a processor having hardware such as memories and a Central Processing Unit (CPU). The control device 12 controls the respective units constituting the vehicle 1. The control device 12 includes an acquisition unit 121, a calculation unit 122, a determination unit 123, and a drive control unit 124.

The acquiring unit 121 acquires the power data related to the degree of acceleration, the vehicle speed of the vehicle 1, the motor rotational speed of PM motor 21 and SR motor 31, and the power status of the battery 6 from the detecting device 11.

The computing unit 122 computes the driving force based on the degree of accelerator opening acquired by the acquiring unit 121, the vehicle speed of the vehicle 1, and the motor rotational speeds of PM motor 21 and SR motor 31.

The determination unit 123 determines whether or not the battery 6 is under the input limit of the power on the basis of the power information acquired by the acquisition unit 121. Further, the determination unit 123 determines whether the traveling mode of the vehicle 1 determined by the drive control unit 124 to be described later is a single motor traveling mode.

The drive control unit 124, the drive control unit 124, based on the driving force calculated by the calculation unit 122, determines the traveling mode. The drive control unit 124 determines, based on whether or not the driving force calculated by the calculation unit 122 is greater than a predetermined value, a single motor running mode for driving one of the two motor running mode or PM motor 21 and SR motor 31 for driving PM motor 21 and SR motor 31, respectively.

Characteristics of Each Motor

Figure 2:
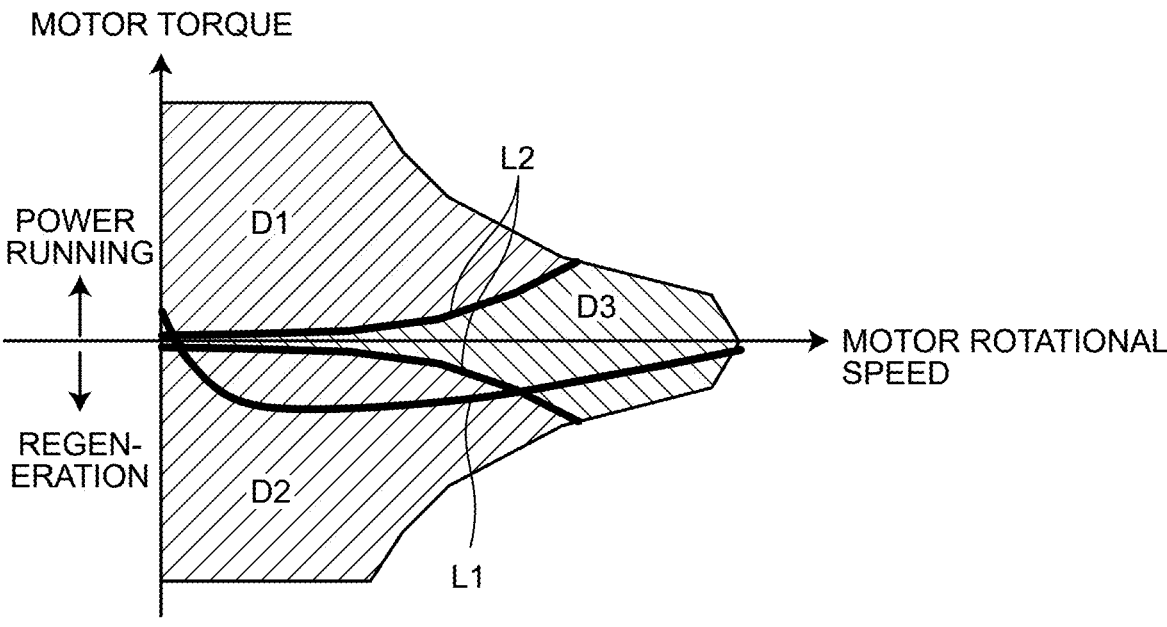
FIG. 2 is a diagram for comparing and explaining characteristics of a PM motor and characteristics of an SR motor provided in a vehicle according to an embodiment.

Next, respective properties of the PM motor 21 and the SR motor 31 will be described. FIG. 2 is a diagram for comparing and explaining characteristics of PM motor 21 and characteristics of SR motor 31. In FIG. 2, the horizontal axis represents the motor rotational speed (vehicle speed), the vertical axis represents the motor torque (driving force). In FIG. 2, the curve L1 illustrates the deceleration when the accelerator is off (deceleration caused by the engine braking). The curve L2 illustrates the timing-border for switching each of the PM motor 21 and the SR motor 31. In the embodiment illustrated in FIG. 2, it will be described assuming that the same maximum-power and body size for each of the PM motor 21 and the SR motor 31.

As illustrated in the area D1, D2 of FIG. 2, PM motor 21 is efficient at low rotation and medium and high load, when it becomes high rotation, since the magnetic field control weakening by the back EMF voltage, loss is deteriorated due to current heat generation. Further, the PM motor 21, the loss is greater than SR motor 31 by the creep loss of the magnets even during no-load operation. In contrast, as illustrated in the area D3 of FIG. 2, the SR motor 31, since there is no back electromotive force without magnetism loss, the loss at no load loss and high rotational speed is better than PM motor 21. Thus the PM motor 21 and the SR motor 31, the loss-characteristics of the regenerative output at the time of regeneration differ from each other.

Processing of the Control Unit

Figure 3:
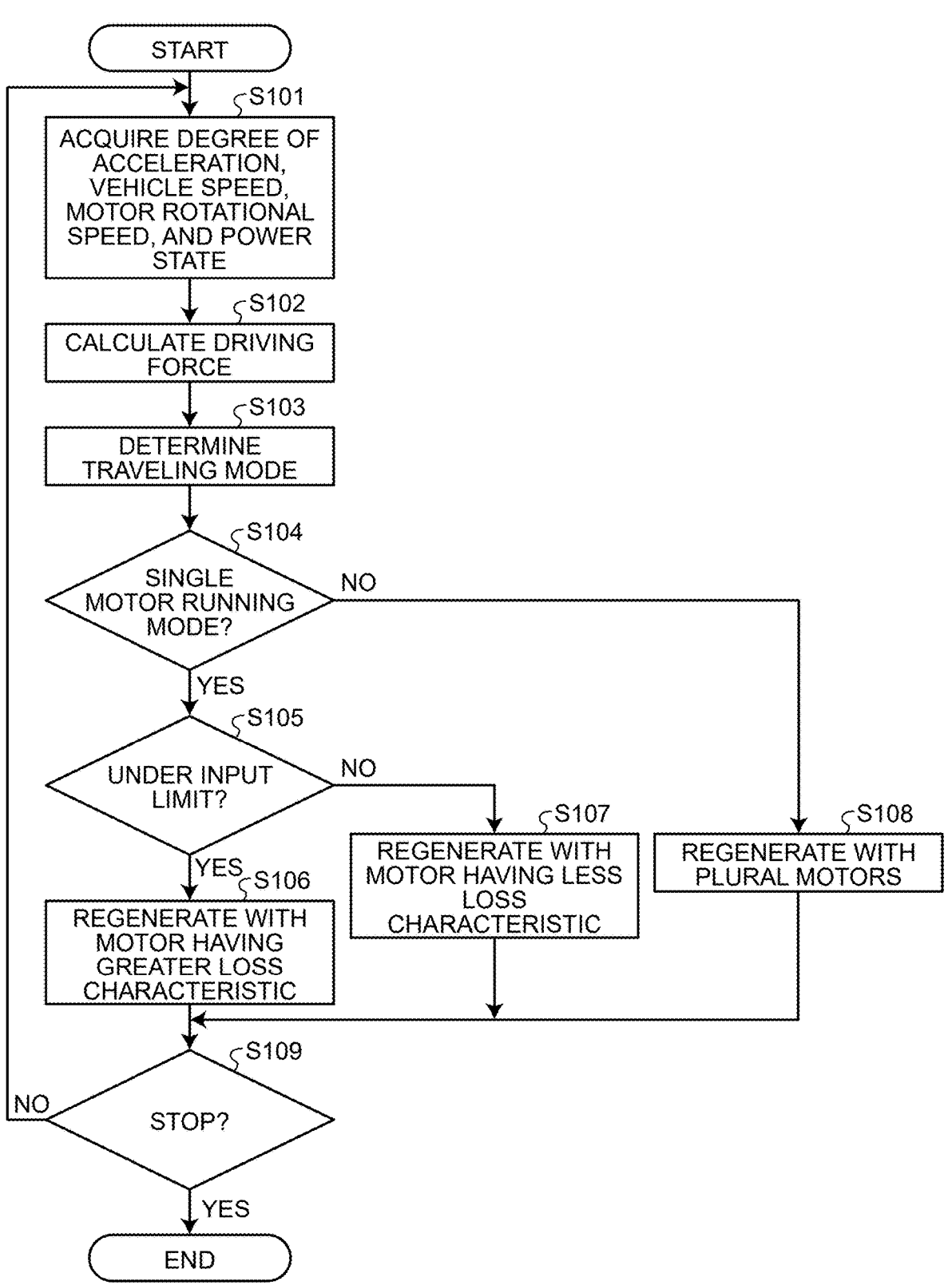
FIG. 3 is a flowchart illustrating an outline of a process that is executed when the control device provided in the vehicle according to an embodiment decelerates.

Next, a process to be executed when deceleration is performed by the control device 12. FIG. 3 is a flowchart illustrating an outline of a process to be performed at the time of deceleration performed by the control device 12.

As illustrated in FIG. 3, the acquiring unit 121 acquires power information regarding the degree of acceleration from the detecting device 11, the vehicle speed of the vehicle 1, the motor rotational speed of each of PM motor 21 and SR motor 31, and the power state of the battery 6 (step S101).

Subsequently, the computing unit 122 computes the driving force on the basis of the acceleration opening degree acquired by the acquiring unit 121, the vehicle speed of the vehicle 1, and the motor rotational speeds of PM motor 21 and SR motor 31, respectively (step S102). Specifically, the computing unit 122 computes the respective torques of PM motor 21 and SR motor 31 based on the degree of accelerator opening acquired by the acquiring unit 121, the vehicle speed of the vehicle 1, the motor rotational speed of PM motor 21, and the motor rotational speed of SR motor 31. The calculation unit 122 may calculate the driving force by further considering the running state of the vehicle 1 using the acceleration detected by the detection device 11. For example, the computing unit 122 may compute the driving force on the basis of acceleration detected by the detecting device 11 and the vehicle 1 determines climbing and descent, and the driving force may be computed based on information obtained by adding the degree of accelerator opening acquired by the acquiring unit 121 to the determination result, the vehicle speed of the vehicle 1, each of the motor rotational speeds of the PM motor 21 and SR motor 31.

Thereafter, the drive control unit 124 determines the traveling mode based on the driving force calculated by the calculation unit 122 (step S103). Specifically, the drive control unit 124, when the driving force calculated by the calculation unit 122 is greater than a predetermined value, determines both motor running mode for driving each of the PM motor 21 and the SR motor 31. In contrast, when the driving force calculated by the calculation unit 122 is not larger than the predetermined value, the drive control unit 124 determines a single motor running mode in which one of PM motor 21 and SR motor 31 is driven.

Subsequently, the determination unit 123 determines whether or not the traveling mode of the vehicle 1 determined by the drive control unit 124 is the single motor traveling mode (step S104). If the driving mode of the vehicle 1 determined by the driving control unit 124 by the determination unit 123 is determined to be a single motor running mode (Yes in step S104), the control device 12, the process proceeds to step S105 to be described later. In contrast, when the driving mode of the vehicle 1 determined by the determination unit 123 by the drive control unit 124 is determined not to be the single motor running mode (No in step S104), the control device 12, the process proceeds to step S108 to be described later.

In step S105, the determination unit 123 determines whether the battery 6 is under the input-limit of the power on the basis of the power information acquired by the acquiring unit 121. When the determination unit 123 determines that the battery 6 is under power input-limiting (Yes in step S105), the control device 12 proceeds to step S106 to be described later. In contrast, when the determination unit 123 determines that the battery 6 is not in the input-limiting state of the power (No in step S105), the control device 12 proceeds to step S107 described below.

In step S106, the drive control unit 124 regenerates the PM motor 21 and the SR motor 31 with the motor having a large loss-characteristics at the present vehicle speed on the basis of the vehicle speed and the required torque.

Figure 4:
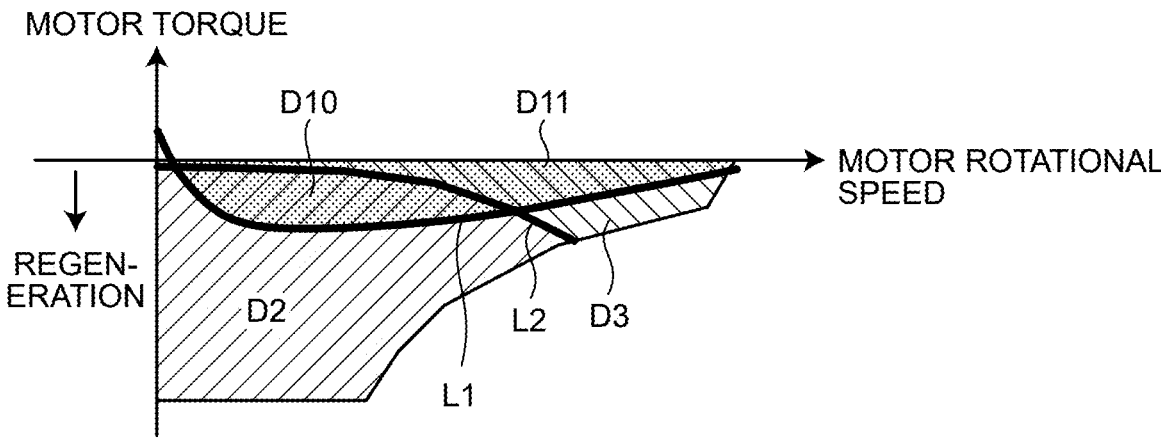
FIG. 4 is a diagram for comparing and explaining characteristics of a PM motor and characteristics of a SR motor at the time of regeneration during input-limiting of electric power for a battery provided in a vehicle according to an embodiment.

FIG. 4 is a diagram for comparing and explaining the characteristics of the PM motor 21 and the characteristics of the SR motor 31 at the time of regeneration during the input-limiting state of electric power to the battery 6. As illustrated in FIG. 4, when the motor torque is low and the motor rotational speed is small, the drive control unit 124 may be an area D2 in which regeneration by PM motor 21 is more efficient, and, as illustrated in the area D10 of FIG. 4, SR motor 31 having a large loss-characteristics at the present vehicle speed is used to regenerate. Similarly, the drive control unit 124, when the motor torque is low and the motor rotational speed is large, even in an area D3 in which regeneration by SR motor 31 is more efficient, as illustrated in the area D11 of FIG. 4, causes the PM motor 21, which has a greater loss in the current vehicle speed to perform the regeneration. Thus, the drive control unit 124 intentionally causes the regeneration with the motor having poor loss characteristics among the PM motor 21 and the SR motor 31, it is possible to secure more braking force than in a case where the regeneration is made with the motor having better loss characteristic. After step S106, the control unit 12 proceeds to step S109 described later.

In step S107, the drive control unit 124 regenerates with one of the PM motor 21 and the SR motor 31 having a smaller loss-characteristics at the present vehicle speed based on the vehicle speed of the vehicle 1 and the required torque.

Figure 5:
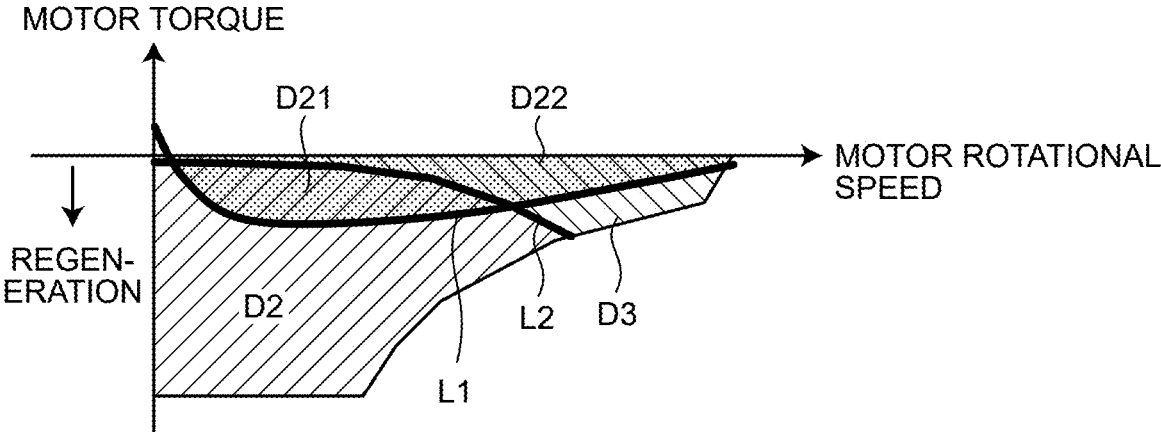
FIG. 5 is a diagram for comparing and explaining characteristics of a PM motor and characteristics of a SR motor during regeneration without an inputting limit of electric power of a battery provided in a vehicle according to an embodiment.

FIG. 5 is a diagram for comparing and explaining characteristics of the PM motor 21 and characteristics of the SR motor 31 at the time of regeneration without inputting the power of the battery 6, and includes area D1, area D2, area D3, area D21, and area D22. As illustrated in FIG. 5, the drive control unit 124 causes the PM motor 21 to regenerate at the present vehicle speed, as illustrated in the area D2 of FIG. 5, since it is a more efficient area D2 to regenerate at the PM motor 21 when the motor torque is low and the motor rotational speed is small. Similarly, the drive control unit 124, when the motor torque is low and the motor rotational speed is large, since the regeneration by SR motor 31 is more efficient area D3, the regeneration by SR motor 31 as illustrated in the area D22 of FIG. 5. After step S107, the control unit 12 proceeds to step S109 described later.

In step S108, the drive control unit 124 regenerates the plurality of motors based on the vehicle speed and the required torque of the vehicle 1. Specifically, the drive control unit 124 regenerates using the PM motor 21 and the SR motor 31, respectively. After step S108, the control unit 12 proceeds to step S109 described later.

In step S109, the determination unit 123 determines whether the vehicle 1 has stopped. If the determination unit 123 determines that the vehicle 1 is stopped (Yes in step S109), the control device 12 ends the process. In contrast, when the determination unit 123 determines that the vehicle 1 is not stopped (No in step S109), the control device 12 returns to step S101.

According to the embodiment described above, when the control device 12 determines that the battery 6 is performing the input limitation of the power during the regeneration of the vehicle 1 based on the power information of the battery 6, the motor of the PM motor 21 and the SR motor 31 having a larger loss-characteristic at the present vehicle speed is used to regenerate the power, so that even when the input limitation of the power of the battery 6 occurs, the braking force can be secured.

Further, according to an embodiment, when the control device 12 determines that the battery 6 is performing the input limit of the power at the time of regeneration of the vehicle 1 based on the power information of the battery 6, the PM motor 21 and the SR motor 31, the SR motor 31 having the greatest loss characteristic at the present vehicle speed is used for regeneration. Therefore, even when the input limit of the power of the battery 6 occurs, the motor having the greatest braking force can be secured.

Further, according to an embodiment, since it is constituted by either one of the PM motor 21 and the SR motor 31 having different loss-characteristics during regeneration of the vehicle 1, without using the hydraulic brake, and since it is possible to secure the braking force, it is possible to reduce the frequency of using the hydraulic brake, and thus, it is possible to improve the durability of the hydraulic brake.

Further, according to an embodiment, in a case where it is determined that the battery 6 performs the input limit of the power during the regeneration of the vehicle 1, since the control device 12 causes only the SR motor 31 having the greater loss characteristic at the present vehicle speed among the PM motor 21 and the SR motor 31 to perform the regeneration, it is possible to ensure that there is a braking force.

Further, in the vehicle according to an embodiment, the above-described "control device" can be read as "control circuit", "control means" and "control unit" or the like.

In the description of the flowchart in the present specification, it has been clarified the relationship before and after the processing between the steps using expressions such as "first," "thereafter," "following," etc., the order of the processing necessary for carrying out the present embodiment is not uniquely defined by their expressions. That is, the order of processing in the flowcharts described herein may be varied to the extent that there is no discrepancy.

Further effects and variations can be readily derived by one skilled in the art. The broader aspects of the disclosure are not limited to the specific details and representative embodiments expressed and described above. Accordingly, various changes may be made without departing from the spirit or scope of the overall inventive concept defined by the appended claims and their equivalents.

While some of the embodiments of the present application have been described in detail based on the drawings, these are illustrative, and it is possible to implement the present disclosure in other forms which are variously modified and improved based on the knowledge of those skilled in the art, starting from the aspects described in the column of the disclosure of the present disclosure.

According to the present disclosure, even when the battery input limit occurs, an effect that it is possible to secure the braking force is achieved. Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle comprising:
   a plurality of motors having different loss characteristics during regeneration,
   a battery that can be charged by power generated during the regeneration of each of the plurality of motors;
   a detection device for detecting power information related to a power state of the battery; and
   a control device for causing a motor, which has a greater loss characteristic of the regeneration than that of another motor among the plurality of motors, to perform the regeneration when determining that the battery is performing an input limit of the power at the time of the regeneration based on the power information.

2. The vehicle according to claim 1, wherein
   the control device causes, when the regeneration is performed on a single motor among the plurality of motors, a motor having a greatest loss characteristic to perform the regeneration.

3. The vehicle according to claim 2, wherein
   each of the plurality of motors includes a permanent magnet type motor or a magnet-less motor without permanent magnets.

4. The vehicle according to claim 3 further comprising:
   a motor for front wheels for driving the front wheels; and
   a motor for rear wheels for driving the rear wheels, wherein
   one of the motor for the front wheels and the motor for the rear wheels includes the permanent magnet type motor, and another of the motor for the front wheels and the motor for the rear wheels includes the magnet-less motor,
   a regenerative output of the permanent magnet type motor is less than the regenerative output of the magnet-less motor, and
   the control device, when determining that the battery is performing the input limit of the power, causes only the magnet-less motor to perform the regeneration.

* * * * *